US011558383B1

(12) United States Patent
Au Yeung et al.

(10) Patent No.: US 11,558,383 B1
(45) Date of Patent: Jan. 17, 2023

(54) SECURING CLOUD APPLICATIONS VIA ISOLATION

(71) Applicant: CA, Inc., San Jose, CA (US)

(72) Inventors: Alex Au Yeung, Menlo Park, CA (US); Amit Kanfer, Netanya (IL); Arunabha Saha, Fremont, CA (US); Manoj Kumar Sharma, Fremont, CA (US); Paul Kao, San Jose, CA (US); Prashanth Prabhu, Mountain View, CA (US); Russell Daigle, Sunnyvale, CA (US); Tobias Pischl, Walnut Creek, CA (US); Yehoshua Chen, Tel Aviv-Jaffa (IL)

(73) Assignee: CA, Inc., San Jose, CA (US)

(*) Notice: Subject to any disclaimer, the term of this patent is extended or adjusted under 35 U.S.C. 154(b) by 466 days.

(21) Appl. No.: 16/354,751

(22) Filed: Mar. 15, 2019

Related U.S. Application Data

(60) Provisional application No. 62/812,698, filed on Mar. 1, 2019.

(51) Int. Cl.
H04L 67/60 (2022.01)
H04L 67/10 (2022.01)
H04L 9/40 (2022.01)

(52) U.S. Cl.
CPC .......... H04L 63/10 (2013.01); H04L 63/0815 (2013.01); H04L 63/0884 (2013.01); H04L 67/60 (2022.05); H04L 67/10 (2013.01)

(58) Field of Classification Search
CPC . H04L 63/10; H04L 63/0815; H04L 63/0884; H04L 67/32; H04L 67/10
See application file for complete search history.

(56) References Cited

U.S. PATENT DOCUMENTS

| 7,793,342 | B1* | 9/2010 | Ebrahimi | ............ H04L 63/0281 726/8 |
| 2002/0174010 | A1* | 11/2002 | Rice, III | ............... G06F 16/182 705/14.67 |
| 2016/0044035 | A1* | 2/2016 | Huang | ................ H04L 41/0806 726/4 |

(Continued)

OTHER PUBLICATIONS

CloudCodes: Benefits of Reverse Proxy Utilization—Using Single Sign-On Solution, https://www.cloudcodes.com/blog/reverse-proxy-utilization-benefits.html. Accessed May 1, 2019.

(Continued)

Primary Examiner — Chris Parry
Assistant Examiner — Steven C Nguyen
(74) Attorney, Agent, or Firm — Adsero IP

(57) ABSTRACT

A method for securing cloud applications is described. The method may include establishing a connection between a cloud application isolation portal, a cloud access security broker, and a cloud application based on an indication of the cloud application and a set of credentials associated with an end user of the cloud application, and managing, via the cloud application isolation portal and the cloud access security broker, a session between the cloud application and a computing device associated with the end user based on the connection between the cloud application isolation portal with the cloud access security broker and the cloud application.

17 Claims, 11 Drawing Sheets

(56) References Cited

U.S. PATENT DOCUMENTS

| | | | | |
|---|---|---|---|---|
| 2016/0188909 A1* | 6/2016 | Zatko | .................... | G06F 21/74 |
| | | | | 726/26 |
| 2019/0097970 A1* | 3/2019 | Coleman | ................ | G06F 21/53 |
| 2019/0190729 A1* | 6/2019 | Levy-Abegnoli | ....... | H04L 45/64 |
| 2021/0250333 A1* | 8/2021 | Negrea | .................. | H04L 9/006 |

OTHER PUBLICATIONS

Bitglass News: Bitglass Announces CASB Zero-Day Core, https://www.bitglass.com/press-releases/bitglass-zero-day-core. Accessed May 1, 2019.

\* cited by examiner

SECURING CLOUD APPLICATIONS VIA ISOLATION

CROSS REFERENCE

The present Application for Patent claims the benefit of U.S. Provisional Patent Application No. 62/812,698 by Alex Au Yeung, et al., entitled "SECURING CLOUD APPLICATIONS VIA ISOLATION," filed Mar. 1, 2019, assigned to the assignee hereof, and expressly incorporated herein.

FIELD OF TECHNOLOGY

The present disclosure relates generally to cloud platform systems, and more specifically to securing cloud applications via isolation

BACKGROUND

A cloud platform (e.g., a computing platform for cloud computing) may be employed by many users and organizations to store, manage, and process data using a shared network of remote servers. Users and organizations may develop applications on the cloud platform to handle the storage, management, and processing of data. In some cases, the cloud platform may utilize a multi-tenant database system. Users and organizations may access the cloud platform using various user devices (e.g., desktop computers, laptops, smartphones, tablets, or other computing systems, etc.).

The use of cloud platform systems and computer-related technologies continues to increase at a rapid pace. The expansive use of cloud platform systems has influenced the advances made to computer-related technologies. Cloud platform systems have increasingly become an integral part of the business world and the activities of individual consumers. Cloud platform systems may be used to carry out several business, industry, and academic endeavors. The widespread use of cloud platforms across various user devices has caused an increased presence in security threats including data theft, embedding malware and viruses, and the like. Due to security threats in cloud platform systems and computer-related technologies, methods for securing cloud applications may be beneficial in preventing security threats to various user devices and organizations.

SUMMARY

A method for securing cloud applications is described. The method may include establishing a connection between a cloud application isolation portal, a cloud access security broker, and a cloud application based at least in part on an indication of the cloud application and a set of credentials associated with an end user of the cloud application, and manage, via the cloud application isolation portal and the cloud access security broker, a session between the cloud application and a computing device associated with the end user based at least in part on the connection between the cloud application isolation portal with the cloud access security broker and the cloud application.

A computing device for securing cloud applications is described. The computing device may include a processor, memory in electronic communication with the processor, and instructions stored in the memory. The instructions may be executable by the processor to cause the computing device to establish a connection between the computing device, a cloud access security broker, and a cloud application based at least in part on an indication of the cloud application and a set of credentials associated with an end user of the cloud application, and manage, via the computing device and the cloud access security broker, a session between the cloud application and a second computing device associated with the end user based at least in part on the connection between the cloud application isolation portal with the cloud access security broker and the cloud application.

A non-transitory computer-readable medium storing code at a computing device for securing cloud applications is described. The code may include instructions executable by a processor to establish a connection between the computing device, a cloud access security broker, and a cloud application based at least in part on an indication of the cloud application and a set of credentials associated with an end user of the cloud application, and manage, via the cloud application isolation portal and the cloud access security broker, a session between the cloud application and a computing device associated with the end user based at least in part on the connection between the cloud application isolation portal with the cloud access security broker and the cloud application.

In some examples of the method, computing devices, and non-transitory computer-readable medium described herein, the cloud access security broker in communication with the cloud application isolation portal and the cloud application monitors and controls traffic associated with the cloud application. In some examples of the method, computing devices, and non-transitory computer-readable medium described herein, managing, via the cloud application isolation portal and the cloud access security broker, the session between the cloud application and the computing device associated with the end user may be further based at least in part on monitoring and controlling of the traffic associated with the cloud application.

Some examples of the method, computing devices, and non-transitory computer-readable medium described herein may further include operations, features, means, or instructions for identifying traffic associated with the cloud application between the cloud application and the computing device associated with the end user, and isolating the traffic associated with the cloud application to the cloud application isolation portal during the session. In some examples of the method, computing devices, and non-transitory computer-readable medium described herein, managing, via the cloud application isolation portal and the cloud access security broker, the session between the cloud application and the computing device associated with the end user may be further based at least in part on the isolating.

Some examples of the method, computing devices, and non-transitory computer-readable medium described herein may further include operations, features, means, or instructions for rendering, to a browser of the computing device associated with the end user and via the cloud application isolation portal, the cloud application or the traffic associated with the cloud application, or both. In some examples of the method, computing devices, and non-transitory computer-readable medium described herein, managing, via the cloud application isolation portal and the cloud access security broker, the session between the cloud application and the computing device associated with the end user may be further based at least in part on the rendering.

In some examples of the method, computing devices, and non-transitory computer-readable medium described herein, rendering, via the cloud application isolation portal, the cloud application or the traffic associated with the cloud application, or both, to the browser of the computing device associated with the end user may be based at least in part on a forward proxy mode.

Some examples of the method, computing devices, and non-transitory computer-readable medium described herein may further include operations, features, means, or instructions for preventing the computing device associated with the end user to process the traffic associated with the cloud application based at least in part on the isolating. In some examples of the method, computing devices, and non-transitory computer-readable medium described herein, managing, via the cloud application isolation portal and the cloud access security broker, the session between the cloud application and the computing device associated with the end user may be further based at least in part on the preventing.

Some examples of the method, computing devices, and non-transitory computer-readable medium described herein may further include operations, features, means, or instructions for providing an interface to a browser of the computing device associated with the end user. In some cases, the interface emulates an interface of the cloud application.

Some examples of the method, computing devices, and non-transitory computer-readable medium described herein may further include operations, features, means, or instructions for receiving the set of credentials associated with the end user of the cloud application based at least in part on the cloud application receiving a request via a browser of the computing device associated with the end user to access the cloud application.

In some examples of the method, computing devices, and non-transitory computer-readable medium described herein, the cloud application forwards the browser of the computing device associated with the end user to a single sign-on resource based at least in part on an identifier of the computing device or an identifier of the end user, or both.

In some examples of the method, computing devices, and non-transitory computer-readable medium described herein, the single sign-on resource may be a proxy.

In some examples of the method, computing devices, and non-transitory computer-readable medium described herein, the single sign-on resource forwards the identifier of the computing device, the identifier of the end user, metadata, or a combination thereof, to an identity provider network entity to authenticate the set of credentials.

In some examples of the method, computing devices, and non-transitory computer-readable medium described herein, the cloud application isolation portal resides remotely from the computing device associated with the end user.

DETAILED DESCRIPTION

Figure 1:
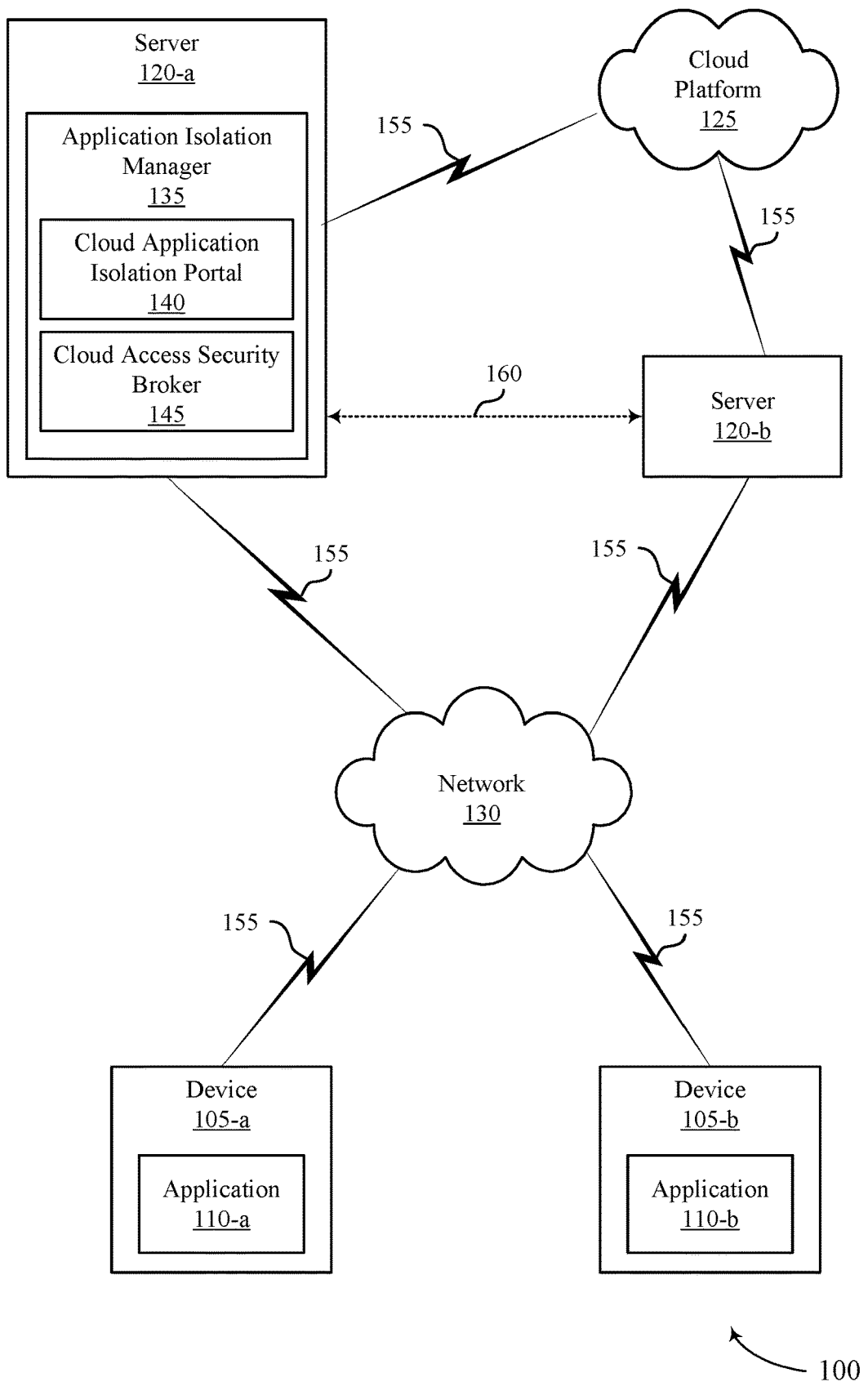
FIG. 1 illustrates a block diagram of an environment that supports securing cloud applications in accordance with aspects of the present disclosure.

The described techniques relate to improved methods, systems, or devices, that support cloud platforms. More specifically, the methods, systems, or devices, described herein relate to securing cloud applications associated with cloud platforms. Some organizations (e.g., corporations, businesses, and the like) may support use of cloud applications to provide access (e.g., to aspects and operations of the organization) to various user devices globally to benefit end user experience and productivity for the organizations. For a managed endpoint, organizations may implement a scheme (e.g., a security agent that may be configured on an endpoint of the organization) to control certain operations and functionalities of the endpoint to reduce or mitigate security threats, such as data loss. A managed endpoint may be an end user device within an organization's network that may be registered to the organization, controlled by the organization, monitored by the organization, or the like.

Some present techniques may be effective in preventing security threats, such as data theft, however these techniques may be only suitable as long as the endpoint is configured (e.g., a managed endpoint configured with a security agent). For example, some techniques introduce a reverse proxy, which may rewrite cloud application universal resource locators (URLs), so that the reverse proxy can integrate with a security agent (e.g., network entity) to enforce certain operations and functionalities of a device. This however requires extensive resources to prevent the cloud application from failing due to changes to the cloud application (e.g., the number of applications allowed to run in the existing reverse proxy model are often limited due to the relatively high resource-intensive tasks associated with maintaining the application functionality). Further, these techniques have shortcoming that include a limitation on the number of cloud applications that can be supported by the security agent using the reverse proxy scheme. Therefore, unmanaged user devices accessing cloud applications expose an organization to data loss risks and create blind spots due to the lack of monitoring capabilities of the unmanaged user devices (e.g., security state, cloud application traffic that are rendered, cached and downloaded to the unmanaged device, etc.).

To address the challenges of securing cloud applications and shortcoming of existing techniques, the methods, systems, or devices, described herein may improve the way that data sessions associated with cloud applications from unmanaged devices are secured, by utilizing a network entity that authenticates an end user of the unmanaged device and redirects the data session through a cloud application isolation portal. The cloud application isolation portal may use a cloud access security broker to control access to the cloud application. For example, the methods, systems, or devices, described herein may establish a connection between a cloud application isolation portal, a cloud access security broker, and a cloud application based at least in part on an indication of the cloud application and a set of credentials associated with an end user of the cloud application. As a result, the methods, systems, or devices, described herein may manage, via the cloud application isolation portal and the cloud access security broker, a session between the cloud application and a computing device associated with the end user based at least in part on the connection between the cloud application isolation portal with the cloud access security broker and the cloud application. The cloud application isolation portal may also provide a seamless user experience, for example, by providing an interface to a browser of the computing device associated with the end user that emulates an interface of the cloud application, while preventing any client-side, local data processing of data associated with the cloud application that could potentially result in data loss.

Accordingly, benefits of the present disclosure may include eliminating disadvantages of existing techniques for securing cloud applications. Further benefits of the present disclosure may include enabling a device (e.g., an end user terminal, a server, a network entity, and the like) to secure data sessions associated with cloud application access by an unmanaged device by isolating the data session associated with the cloud application to a cloud application isolation portal residing remotely from the unmanaged device. The benefits of the present disclosure may also include preventing the unmanaged device from performing client-side processing (e.g., storing or caching data locally, etc.) of any data associated with the data session. The benefits of the present disclosure may also include providing the same seamless, secure access to a cloud data environment across multiple unmanaged devices. Thus, benefits of the present disclosure may allow the cloud application to run in isolation on an end user device browser with all the functionality of the cloud application, but without the risk of uncontrolled breaking out of the isolation, preventing data loss based on the active avoidance of processing data locally on the unmanaged device.

Aspects of the disclosure are initially described in the context of an environment. Aspects are then described with respect to process flow that supports securing cloud applications in accordance with aspects of the present disclosure. Aspects of the disclosure are further illustrated by and described with reference to apparatus diagrams, system diagrams, and flowcharts that relate to securing cloud applications in accordance with aspects of the present disclosure.

FIG. 1 illustrates a block diagram of an environment 100 that supports securing cloud applications in accordance with aspects of the present disclosure. As depicted, the environment 100 may include a device 105-*a*, a device 105-*b*, a server 120-*a*, a server 120-*b*, and a cloud platform 125. The techniques described herein may be performed on a device (e.g., the device 105 or the server 120, or a combination thereof). In the illustrated embodiment, the device 105-*a*, the device 105-*b*, the server 120-*a*, the server 120-*b*, and the cloud platform 125 may be communicatively coupled via a network 130 (e.g., via communication links 155).

The devices 105 in the environment 100 may be used by way of example. While, the environment 100 illustrates two devices 105, the present disclosure applies to any system architecture having one or more devices 105. Furthermore, while a single network is coupled to the device 105-*a*, the device 105-*b*, the server 120-*a*, the server 120-*b*, and the cloud platform 125, the present disclosure applies to any system architecture having any number of networks that may be communicatively coupled to the device 105-*a*, the device 105-*b*, the server 120-*a*, the server 120-*b*, and the cloud platform 125. Similarly, while the environment 100 illustrates two servers 120, the present disclosure applies to any system architecture having one or more servers.

In some cases, the device 105-*a*, the device 105-*b*, the server 120-*a*, or the server 120-*b*, or a combination thereof may include a personal electronic device such as a cellular phone, a personal digital assistant (PDA), a tablet computer, a laptop computer, or a personal computer. The device 105-*a* may include an application 110-*a*, while the device 105-*b* may include an application 110-*b*. The applications 110 may be a same or a different application downloaded, installed, and running on the devices 105. The applications 110 may be referred to herein as a cloud application or cloud-based application (e.g., web-based application accessible via a browser of the device 105). A browser may be a software program running on devices 105 that provides an interface for displaying application interfaces, supports navigating the Internet via network 130, and the like. In some cases, the devices 105 may have one or more additional applications installed.

The servers 120 may include an application isolation manager as described with reference to FIGS. 3 through 6, where at least a portion of the functions of the application isolation manager are performed separately or concurrently on the devices 105 or the servers 120, or both. For example, server 120-*a* may include an application isolation manager 135 as described with reference to FIGS. 3 through 6. Additionally, or alternatively, the devices 105 may include an application isolation manager as described with reference to FIGS. 3 through 6, where at least a portion of the functions of the application isolation manager are performed separately or concurrently on the devices 105 or the servers 120, or both. Similarly, in some cases, a person may access the functions of the devices 105 (directly or through the devices 105 via an application isolation manager).

The device 105-*a* may include a cloud-based application that interfaces with one or more functions of the application isolation manager 135 residing on the server 120-*a*, as described with reference to FIGS. 3 through 6. It is noted that in some cases, the devices 105 may not include an application isolation manager as described with reference to FIGS. 3 through 6. For example, the devices 105 may include the applications 110 that allows the devices 105 to interface with an application isolation manager that may be located on another device or the servers 120 (e.g., the server 120-*a*). Although the components of the devices 105 are depicted as being internal to the device 105, it is understood that one or more of the components may be external to the devices 105 and connect to the devices 105 through wired or wireless connections, or both (e.g., via the communication links 155).

The servers 120 may be a computing system or an application that may be an intermediary node in the environment 100 between the device 105-*a*, the device 105-*b*, or the cloud platform 125, or a combination thereof. The servers 120 may include any combination of a social network server, data server, a cloud server, a server associated with an automation service provider, proxy server, mail server, web server, application server, database server, communications server, file server, home server, mobile server, name server, or any combination thereof. In some cases, the servers 120 may include an application distribution platform.

The servers 120 may receive a request from one or more of the devices 105 seeking resources from the servers 120 and/or the cloud platform 125. In some cases, the devices 105 may communicate with the servers 120 via the network 130. Examples of the network 130 may include any combination of cloud networks, local area networks (LAN), wide area networks (WAN), virtual private networks (VPN), wireless networks (using 802.11, for example), cellular networks (using 3G, LTE, or new radio (NR) systems (e.g., 5G) for example), etc. In some cases, network 130 may include the Internet. In some cases, the servers 120 may communicate with each other via a communication link 160. The communication link 160 may be a wired connection or a wireless connection.

In some examples, the servers 120 may receive requests from the devices 105 instructing the servers 120 to provide an executable file to install an application (e.g., the applications 110) from the application distribution platform (e.g., via the cloud platform 125) to the devices 105. For example, a person may, using at least one of the devices 105, install one or more software applications from the cloud platform 125, which may be hosted by at least one of the servers 120 via the communication links 155. The person may discover, browse, share, and download software applications from the application distribution platform. In some examples, applications offered by the application distribution platform may be characterized based on a category, and the person may select a category to discover and download (e.g., install) an application on one or more of the devices 105. For example, an application category may include books, business, finance, among others. As such, applications 110 may include at least one example of a cloud-based service or cloud-based application, as described above.

Cloud platform 125 may be an example of a public or private cloud network. Devices 105 may also be referred to here as a cloud client, which may access the cloud platform 125 over network 130. The network 130 may implement transfer control protocol and internet protocol (TCP/IP), such as the Internet, or may implement other network protocols. In some examples, a device 105 may be operated by an end user that is part of a business, an enterprise, a non-profit, a startup, or any other organization type. A cloud client may access cloud platform 125 to store, manage, and process data associated with an application 110. In some cases, devices 105 may have an associated security or permission level where access to data may be limited based on a policy associated with one or more user accounts (e.g., a first permission level for a first user and a second permission level for a second user where access of the first permission level is limited to the same or a different access as the second permission level). A cloud client may have access to certain applications, data, and database information within the cloud platform 125 based on the associated security or permission level, and may not have access to others. The cloud platform 125 may offer an on-demand database service to the devices 105. In some cases, the cloud platform 125 may be an example of a multi-tenant database system. In this case, the cloud platform 125 may serve multiple cloud clients with a single instance of software. However, other types of systems may be implemented, including—but not limited to—client-server systems, mobile device systems, and mobile network systems.

Some organizations (e.g., companies, industries, and the like) may support use of cloud applications (e.g., applications 110) to provide access to aspects and operations of the organization to various devices 105. For a managed endpoint, organizations may implement a scheme (e.g., a security agent that may be configured on an endpoint of the organization) to control certain operations and functionalities of the endpoint to decrease or mitigate security threats. For example, a managed endpoint may be at least one device 105 (e.g., the device 105-a), which may be within an organization's network that may be registered to the organization, controlled by the organization, monitored by the organization, or the like. Some data loss prevention schemes may be effective in preventing security threats, such as data theft, however these schemes may be only suitable as long as the device 105 is within the organization's network. However, unmanaged user devices, for example, such as device 105-b accessing cloud applications on the cloud platform 125 may expose an organization to data loss risks and create blind spots due to lack of monitoring capabilities of the unmanaged device (e.g., security state, cloud application traffic that are rendered, cached and downloaded to the unmanaged device). To solve the problems of securing cloud applications and shortcoming of present techniques, the present disclosure described herein may improve the way that data sessions associated with cloud applications (e.g., of cloud platform 125) and accessed by unmanaged devices (e.g., device 105-a or device 105-b, or both) are secured, by utilizing one or more network entities to authenticate an end user of the unmanaged device and redirects the data session through a secure network entity (e.g., proxy), which may be associated with or reside on the server 120-a or the server 120-b, or both. The network entity may be part of or include the server 120-a or the server 120-b, or both.

By way of example, application isolation manager 135 may receive a request from one or more of the devices 105 seeking resources from the servers 120 and/or the cloud platform 125. For example, an end user may submit a request to access resources of a cloud application (e.g., application 110) associated with the cloud platform 125. In some examples, the request may include a set of credentials associated with the end user of the cloud application submitted via a browser of the device 105. In some examples, the cloud application may forward the browser of the device 105 to a single sign-on resource based at least in part on an identifier of the device 105 or an identifier of the end user, or both. A single sign-on resource may be a proxy that may utilize, for example, lightweight directory access protocol (LDAP) and stored LDAP databases on the servers 120. Although LDAP may be an example of a single sign-on resource, it is understood that other single sign-on resources may be applicable. For example, any single sign-on resource that uses SAML for transferring authentication information between the identity provider (e.g., a server 120) and the service provider (e.g., a server 120) may be used. A proxy may include the server 120-a or the server 120-b, or both. In some examples, the single sign-on resource may forward the identifier of the device 105, the identifier of the end user, metadata, or a combination thereof, to an identity provider network entity (e.g., a server 120) to authenticate the set of credentials.

The cloud application isolation portal 140, which may be associated with or reside on the server 120-a or the server 120-b, or both, may use a cloud access security broker 145 to control access to a cloud application (e.g., application 110) associated with the cloud platform 125. The cloud access security broker 145 may be an on-premises or cloud-based security policy enforcement point that may be positioned between cloud service consumers (e.g., devices 105) and cloud service providers (e.g., cloud platform 125) to combine and interject enterprise security policies as cloud-based resources are accessed. For example, the cloud application isolation portal 140 may establish a connection with the cloud access security broker 145 or a cloud application (e.g., application 110 associated with the cloud platform 125), or both, based at least in part on an indication of the cloud application and the set of credentials associated with an end user of the cloud application.

The cloud application isolation portal 140 may manage, with the cloud access security broker 145, a session between the cloud application and a device 105 (e.g., an unmanaged device 105-*a* or 105-*b*) based at least in part on the connection between the cloud application isolation portal 140 with the cloud access security broker 145 and the cloud application. The cloud application isolation portal 140 may also provide a unified user experience, for example, by providing an interface to a browser of the device 105 that emulates an interface of the cloud application, while performing a security action, for example, including preventing any client-side data processing of data associated with the cloud application at the device 105. In some examples, the cloud access security broker 145 in communication with the cloud application isolation portal 140 and the cloud application may monitor and control traffic associated with the cloud application. As such, the cloud application isolation portal 140, which may be associated with or reside on the server 120-*a* or the server 120-*b*, or both, may manage, with the cloud access security broker 145, the session between the cloud application and at least one of the devices 105 (e.g., device 105-*b*) based at least in part on monitoring and controlling of the traffic associated with the cloud application.

The cloud application isolation portal 140 in combination with the cloud access security broker 145 may identify traffic associated with the cloud application between the cloud application and at least one of the devices 105, and isolate the traffic associated with the cloud application to the cloud application isolation portal 140 during the session. Here, the cloud application isolation portal 140 may manage, with the cloud access security broker 145, the session between the cloud application and at least one of the devices 105 based at least in part on the isolating. In some examples, the cloud application isolation portal 140 in combination with the cloud access security broker 145 may render to a browser of at least one of the devices 105 the cloud application or the traffic associated with the cloud application, or both to provide a seamless user experience and mirror an interface of the cloud application to prevent potential data leakage. In some examples, cloud application isolation portal 140 in combination with the cloud access security broker 145 may render the cloud application or the traffic associated with the cloud application, or both, to the browser of the device 105 based at least in part on a forward proxy mode. The cloud application isolation portal 140 in combination with the cloud access security broker 145 may prevent one or more of the devices 105 from processing locally the traffic associated with the cloud application based at least in part on the isolating the cloud application from at least one of the devices 105.

As such, the cloud application isolation portal 140 with the cloud access security broker 145 may allow a device 105 to connect to a cloud application through a browser. Once the cloud application identifies an end user (or device 105), the cloud application may redirect the browser to a configured single-sign on resource. For example, a security assertion markup language (SAML) proxy. The SAML proxy may identify the end user (or the device 105) and redirect this information to a network entity (e.g., Identity Provider) to authenticate the end user (or the device 105) before being redirected to the cloud application isolation portal 140. Additionally or alternatively, the SAML proxy may identify metadata associated with an end user and/or device (e.g., browser type, browser version, device operating system, device processor type or related processor information, media access control (MAC) address, IP address, etc.) and may send at least a part of this metadata to the network entity (e.g., Identity Provider) to authenticate the end user (or device 105). The cloud application isolation portal 140 may then use the credentials of the request and establish a connection with the cloud application on behalf of the browser of the device 105. From that point the cloud application isolation instance may leverage the cloud application isolation portal 140 and the cloud access security broker 145 (e.g., forward proxy mode) to access and control the cloud application.

By running a cloud application in isolation, the techniques described herein enables the cloud application isolation portal 140 and the cloud access security broker 145 to treat the isolation instance like an endpoint and therefore support any number of cloud-based applications. As an example, the present techniques are an improvement over existing techniques that use a reverse proxy and limit the number of simultaneous instances that may be ran at a given time. Another benefit of isolating the cloud application traffic is that the rendering of the cloud application and data is contained and controlled within the cloud application isolation portal 140. This enables the techniques described herein to prevent client-side processing of any data, as the cloud application isolation portal 140 is a remotely controlled instance.

The cloud application isolation portal 140 with the cloud access security broker 145 may support post authentication (e.g., post Identity Provider), for example, when the device 105 may post an SAML response into the cloud application isolation portal 140 (e.g., a mirror gateway backend (e.g., SAML proxy)), and being capable of responding and opening a data session associated with the cloud application to the device 105 while the cloud application isolation portal 140 takes over the credentialed request to the cloud application to render the application in isolation to enforce security policies. As a result, the techniques described herein may protect and control an organizations' data regardless of what browsing device is interacting with a cloud application, and prevent any sensitive data from remaining on the devices 105 (i.e. cloud data remaining in the browser cache of a device 105) to prevent potential data leakage.

Accordingly, the techniques described herein beneficially provide improvements to securing cloud applications to decrease or mitigate data loss and protect devices 105 against data leakage and malicious attacks. Furthermore, the techniques described herein provide improvements to the operation of the devices 105. For example, by securing cloud applications and mitigating potential security risks of malicious entities embedding malware onto a device, the operating characteristics such as processer usage and memory usage of the devices 105 may be conserved. In addition, the techniques described herein may improve security of cloud applications, cloud application traffic data, cloud-based services, cloud-based subscriptions, and the like.

Figure 2:
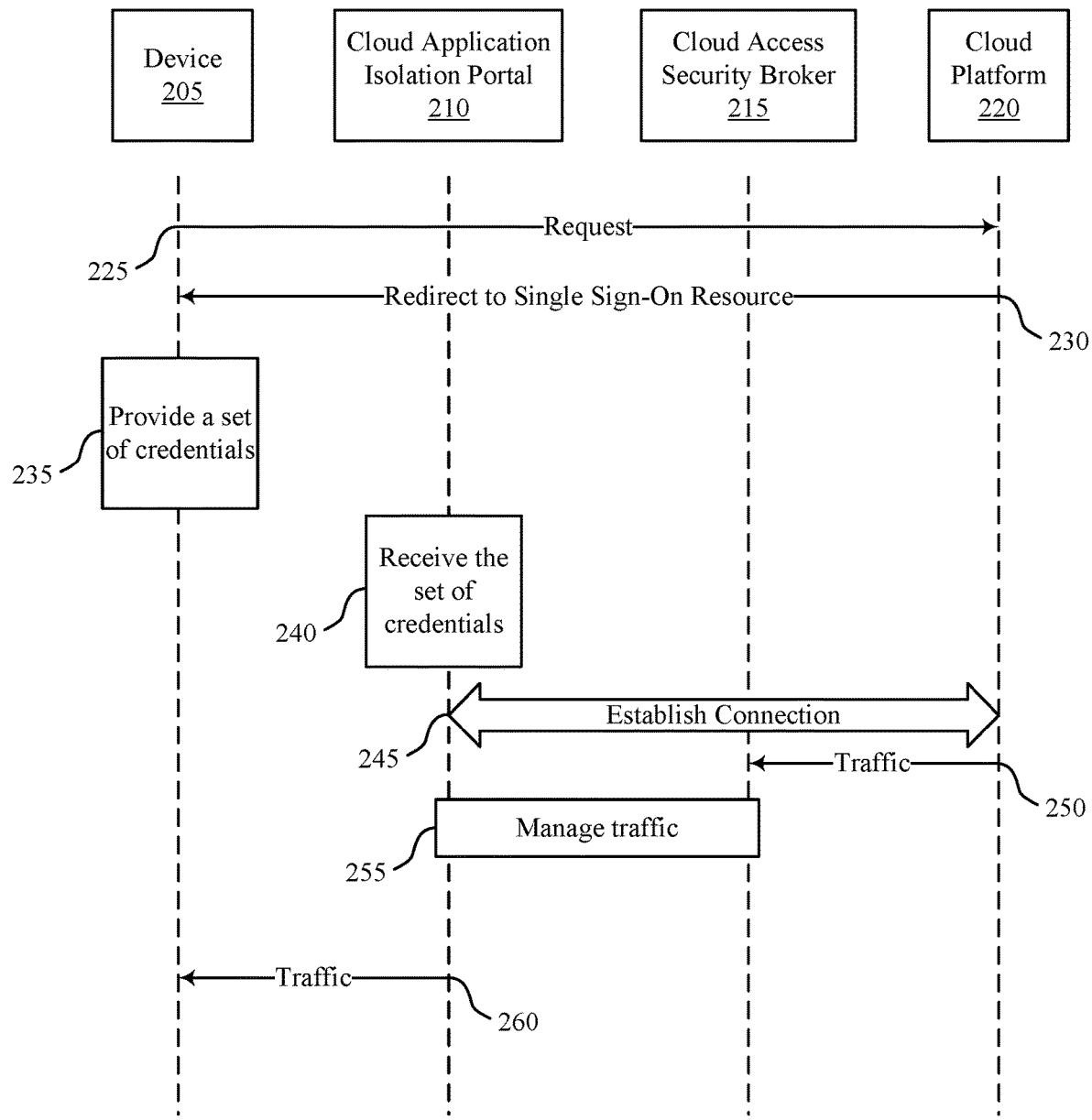
FIG. 2 illustrates a process flow that supports securing cloud applications in accordance with aspects of the present disclosure.

FIG. 2 illustrate a process flow 200 that supports securing cloud applications in accordance with aspects of the present disclosure. In some examples, the process flow 200 may implement aspects of the environment 100. The process flow 200 may include a device 205, a cloud applications isolation portal 210, a cloud access security broker 215, and a cloud platform 220, which may be examples of the corresponding devices described with reference to FIGS. 1, 3 through 6, 10, and 11.

In the following description of the process flow 200, the operations between the device 205, the cloud applications isolation portal 210, the cloud access security broker 215, and the cloud platform 220 may be transmitted in a different order than the exemplary order shown, or the operations performed by the device 205, the cloud applications isolation portal 210, the cloud access security broker 215, and the cloud platform 220 may be performed in different orders or at different times. Certain operations may also be left out of the process flow 200, or other operations may be added to the process flow 200.

At 225, the device 205 may submit (e.g., transmit) a request to the cloud platform 220 to access a cloud application. For example, the device 205 may submit the request to access the cloud application via a browser of the device 205. At 230, the cloud platform 220 may redirect the device 205 to a single sign-on resource. For example, upon the cloud application identifying the device 205, the cloud platform 220 may redirect a browser of the device 205 to a configured single sign-on resource.

At 235, the device 205 may provide a set of credentials (e.g., username, password, a personal identification code, biometric information, two-factor authentication, or any combination thereof) to the single sign-on resource, which may be a SAML proxy. The SAML proxy may identify the device 205, as well as metadata, and redirect this information to an identity provider, which may authenticate an end user of the device 205 (e.g., authenticate credentials provided by the end user) before redirecting the device 205 to the cloud application isolation portal 210. At 240, the cloud application isolation portal 210 may receive the set of credentials associated with the request. At 245, cloud application isolation portal 210 may establish a connection with the cloud access security broker 215 and the cloud platform 220 (e.g., the cloud application for which the device 205 is requesting access to) based at least in part on the received credentials.

At 250, the cloud platform 220 may communicate traffic (e.g., cloud application traffic) to the cloud access security broker 215. In some cases, the cloud access security broker 215 may monitor the traffic to assess the traffic and apply security policies according to the policies associated with the authenticated end user. At 255, the cloud application isolation portal 210 and the cloud access security broker 215 may manage the traffic before providing it to the device 205. At 260, the cloud application isolation portal 210 may provide the traffic associated with the cloud application to the device 205. For example, the cloud application isolation portal 210 may provide an interface to a browser of the device 205 that emulates an interface of the cloud application.

Benefits of the process flow 200 may include eliminating disadvantages of existing techniques for securing cloud applications (e.g., data leakage, limited number of simultaneous instances, etc.). For example, benefits of the process flow 200 may include enabling devices (e.g., an end user terminal, a server, a network entity, and the like) to secure data sessions associated with cloud application from an unmanaged device by isolating the data session associated with the cloud application to a cloud application isolation portal residing remotely from the unmanaged device. The process flow 200 may also include preventing the unmanaged device from performing client-side processing of data associated with the data session (e.g., data of cloud platform 220).

Figure 3:
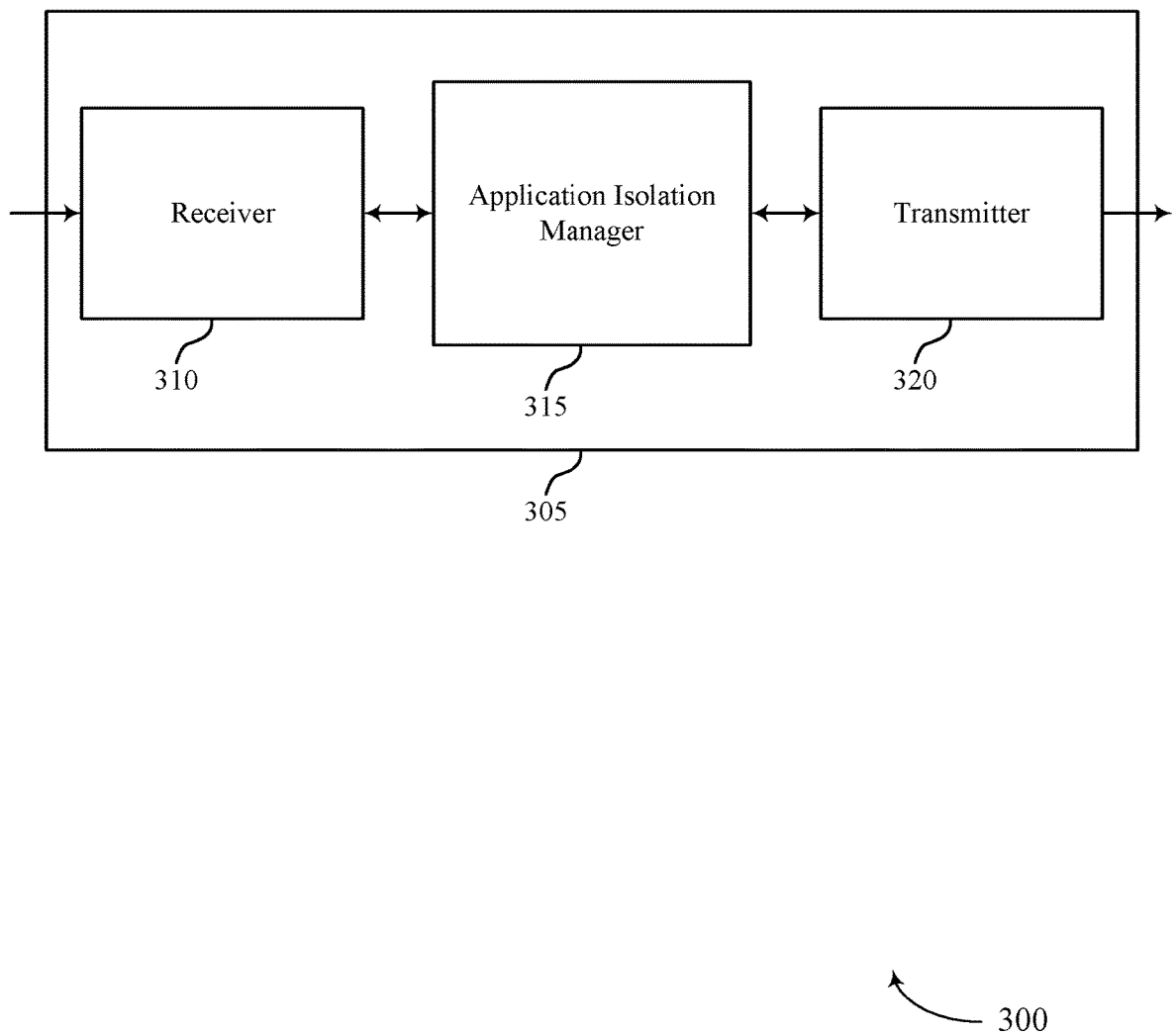
FIGS. 3 and 4 show block diagrams of devices that support securing cloud applications in accordance with aspects of the present disclosure.

FIG. 3 shows a block diagram 300 of a device 305 that supports securing cloud applications in accordance with aspects of the present disclosure. The device 305 may be an example of aspects of a device as described herein. The device 305 may include a receiver 310, an application isolation manager 315, and a transmitter 320. The device 305 may also include a processor. Each of these components may be in communication with one another (e.g., via one or more buses).

The receiver 310 may receive information such as packets, user data, or control information associated with various information channels (e.g., control channels, data channels, and information related to cloud applications, etc.). Information may be passed on to other components of the device 305. The receiver 310 may be an example of aspects of the transceiver 620 described with reference to FIG. 6. The receiver 310 may utilize a single antenna or a set of antennas.

The application isolation manager 315 may establish a connection between a cloud application isolation portal, a cloud access security broker, and a cloud application based at least in part on an indication of the cloud application and a set of credentials associated with an end user of the cloud application, and manage, via the cloud application isolation portal and the cloud access security broker, a session between the cloud application and a computing device associated with the end user based at least in part on the connection between the cloud application isolation portal with the cloud access security broker and the cloud application.

The application isolation manager 315, or its sub-components, may be implemented in hardware, code (e.g., software or firmware) executed by a processor, or any combination thereof. If implemented in code executed by a processor, the functions of the application isolation manager 315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The application isolation manager 315, or its sub-components, may be physically located at various positions, including being distributed such that portions of functions are implemented at different physical locations by one or more physical components. In some examples, the application isolation manager 315, or its sub-components, may be a separate and distinct component in accordance with various aspects of the present disclosure. In some examples, the application isolation manager 315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 320 may transmit signals generated by other components of the device 305. In some examples, the transmitter 320 may be collocated with a receiver 310 in a transceiver module. For example, the transmitter 320 may be an example of aspects of the transceiver 620 described with reference to FIG. 6. The transmitter 320 may utilize a single antenna or a set of antennas.

Figure 4:
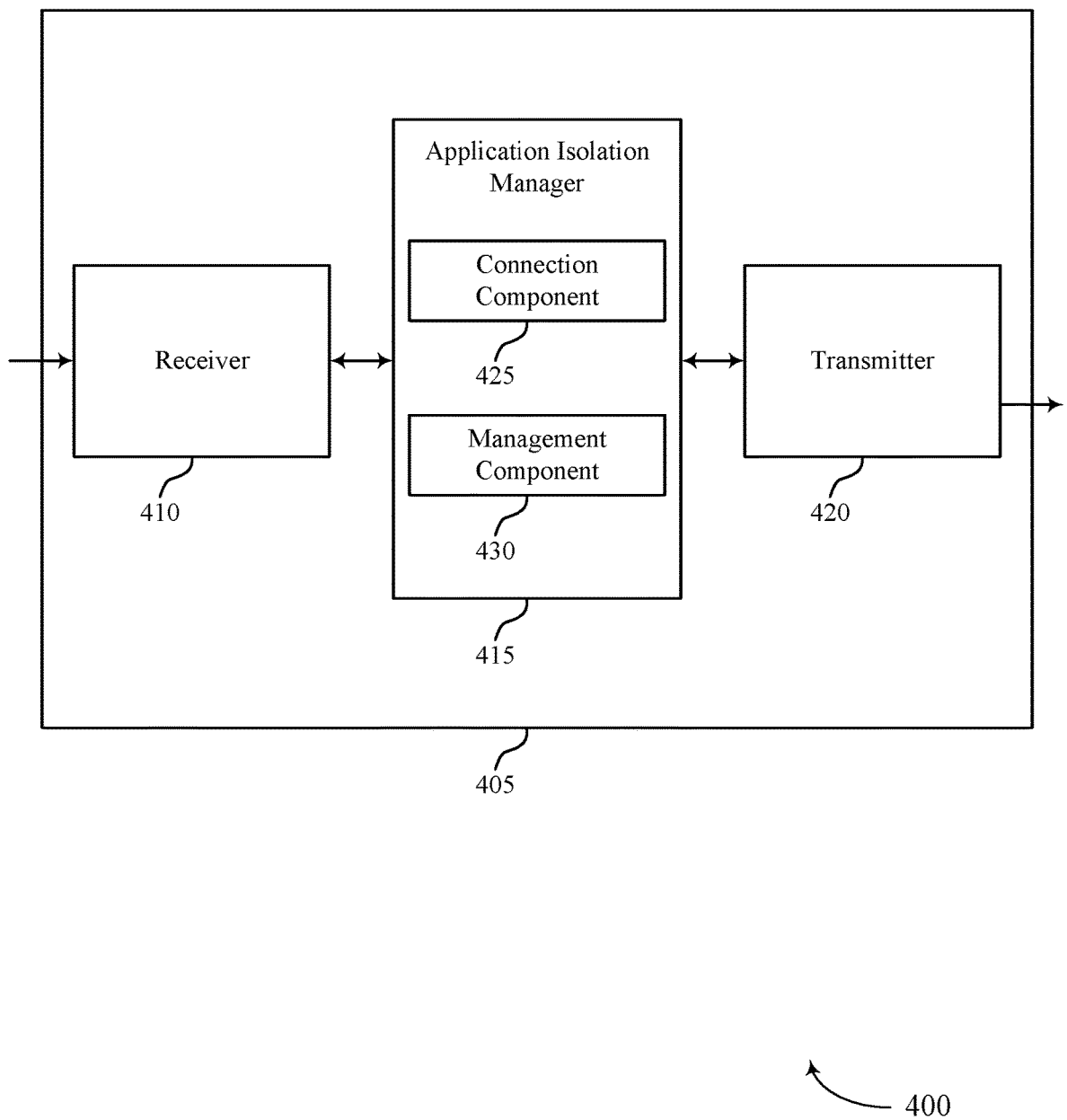

FIG. 4 shows a block diagram 400 of a device 405 that supports securing cloud applications in accordance with aspects of the present disclosure. The device 405 may be an example of aspects of a device 305 or a device as described herein. The device 405 may include a receiver 410, an application isolation manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to cloud applications, etc.). Information may be passed on to other components of the device 405. The receiver 410 may be an example of aspects of the transceiver 620 described with reference to FIG. 6. The receiver 410 may utilize a single antenna or a set of antennas.

The application isolation manager 415 may be an example of aspects of the application isolation manager 315 as described herein. The application isolation manager 415 may include a connection component 425 and a management component 430. The application isolation manager 415 may be an example of aspects of the application isolation manager 610 described herein.

The connection component 425 may establish a connection between a cloud application isolation portal, a cloud access security broker, and a cloud application based at least in part on an indication of the cloud application and a set of credentials associated with an end user of the cloud application. The management component 430 may manage, via the cloud application isolation portal and the cloud access security broker, a session between the cloud application and a computing device associated with the end user based at least in part on the connection between the cloud application isolation portal with the cloud access security broker and the cloud application. In some examples, the cloud access security broker in communication with the cloud application isolation portal and the cloud application may monitor and control traffic associated with the cloud application. In these examples, the management component 430 may manage, via the cloud application isolation portal and the cloud access security broker, the session between the cloud application and the computing device associated with the end user is further based at least in part on monitoring and controlling of the traffic associated with the cloud application.

The transmitter 420 may transmit signals generated by other components of the device 405. In some examples, the transmitter 420 may be collocated with a receiver 410 in a transceiver module. For example, the transmitter 420 may be an example of aspects of the transceiver 620 described with reference to FIG. 6. The transmitter 420 may utilize a single antenna or a set of antennas.

Figure 5:
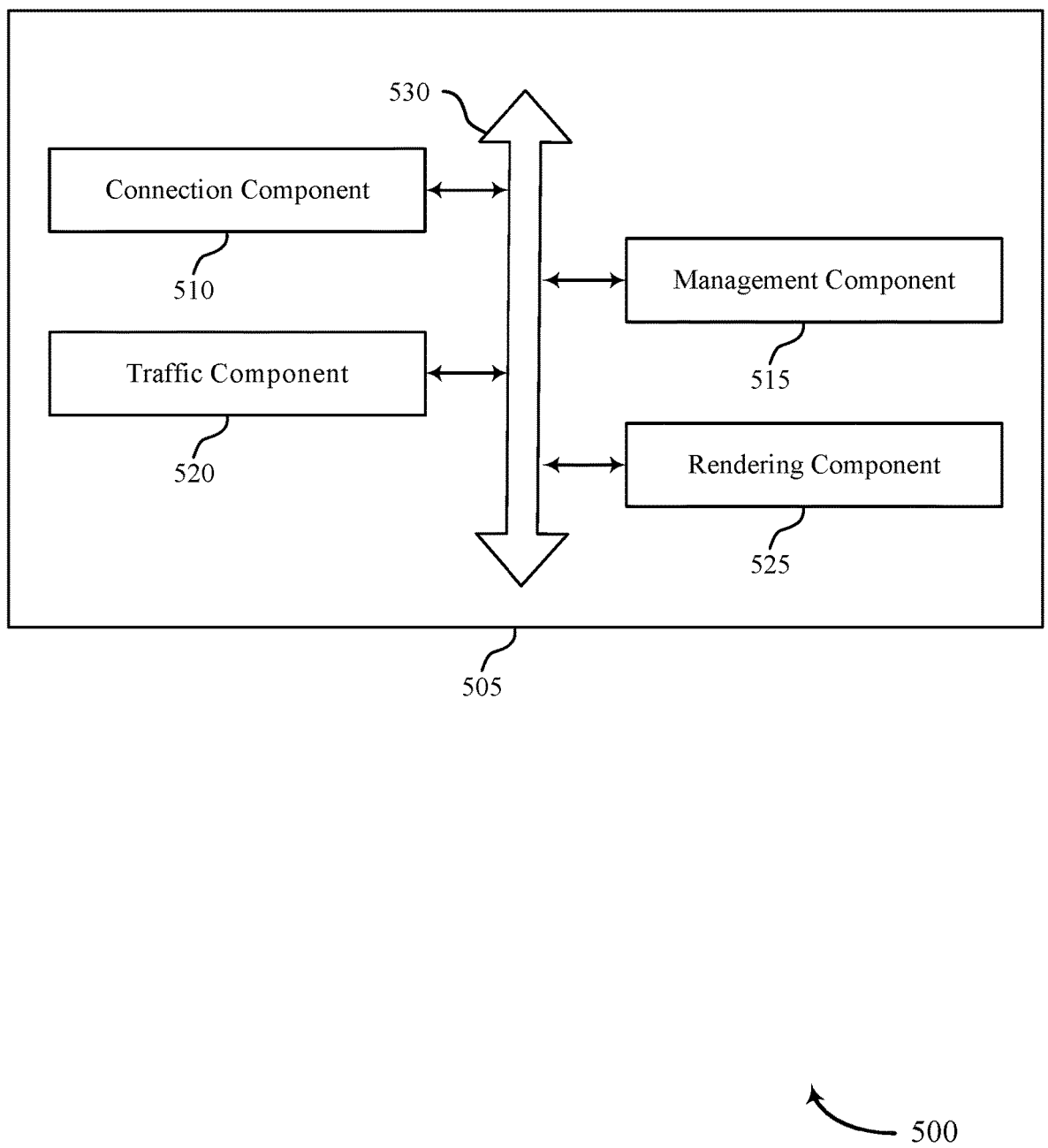
FIG. 5 shows a block diagram of an application isolation manager that supports securing cloud applications in accordance with aspects of the present disclosure.

FIG. 5 shows a block diagram 500 of an application isolation manager 505 that supports securing cloud applications in accordance with aspects of the present disclosure. The application isolation manager 505 may be an example of aspects of an application isolation manager 315, an application isolation manager 415, or an application isolation manager 610 described herein. The application isolation manager 505 may include a connection component 510, a management component 515, a traffic component 520, and a rendering component 525. Each of these components may communicate, directly or indirectly, with one another (e.g. via one or more buses).

The connection component 510 may establish a connection between a cloud application isolation portal, a cloud access security broker, and a cloud application based at least in part on an indication of the cloud application and a set of credentials associated with an end user of the cloud application. The connection component 510 may receive the set of credentials associated with the end user of the cloud application based at least in part on the cloud application receiving a request via a browser of the computing device associated with the end user to access the cloud application. In some examples, the cloud application forwards the browser of the computing device associated with the end user to a single sign-on resource based at least in part on an identifier of the computing device or an identifier of the end user, or both. In some examples, the single sign-on resource may include a proxy. In some examples, the single sign-on resource forwards the identifier of the computing device, the identifier of the end user, metadata, or a combination thereof, to an identity provider network entity to authenticate the set of credentials. The cloud application isolation portal may reside remotely from the computing device associated with the end user.

The management component 515 may manage, via the cloud application isolation portal and the cloud access security broker, a session between the cloud application and a computing device associated with the end user based at least in part on the connection between the cloud application isolation portal with the cloud access security broker and the cloud application. In some examples, the cloud access security broker in communication with the cloud application isolation portal and the cloud application may monitor and control traffic associated with the cloud application. In these examples, the management component 515 may manage, via the cloud application isolation portal and the cloud access security broker, the session between the cloud application and the computing device associated with the end user is further based at least in part on monitoring and controlling of the traffic associated with the cloud application. The management component 515 may prevent the computing device associated with the end user to process the traffic associated with the cloud application based at least in part on the isolating. In these examples, the management component 515 may manage, via the cloud application isolation portal and the cloud access security broker, the session between the cloud application and the computing device associated with the end user is further based at least in part on the preventing.

The traffic component 520 may identify traffic associated with the cloud application between the cloud application and the computing device associated with the end user, and isolate the traffic associated with the cloud application to the cloud application isolation portal during the session. In these examples, the management component 515 may manage, via the cloud application isolation portal and the cloud access security broker, the session between the cloud application and the computing device associated with the end user is further based at least in part on the isolating.

The rendering component 525 may render, to a browser of the computing device associated with the end user and via the cloud application isolation portal, the cloud application or the traffic associated with the cloud application, or both. In these examples, the management component 515 may manage, via the cloud application isolation portal and the cloud access security broker, the session between the cloud application and the computing device associated with the end user may be further based at least in part on the rendering. In some examples, rendering, via the cloud application isolation portal, the cloud application or the traffic associated with the cloud application, or both, to the browser of the computing device associated with the end user is based at least in part on a forward proxy mode. The rendering component 525 may provide an interface to a browser of the computing device associated with the end user. In some cases, the interface emulates an interface of the cloud application.

Figure 6:
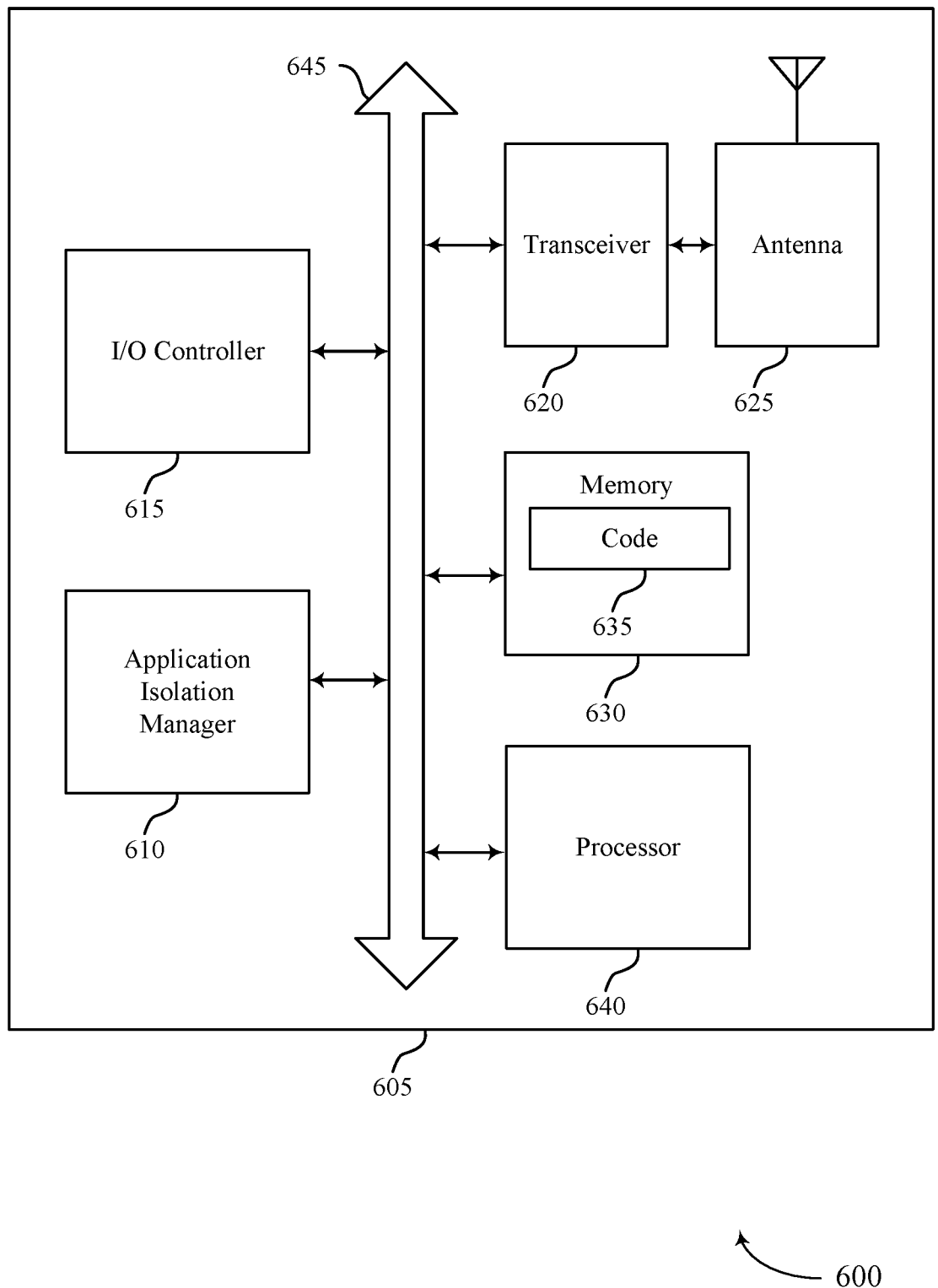
FIG. 6 illustrates block diagram of a system including a device that supports securing cloud applications in accordance with aspects of the present disclosure.

FIG. 6 illustrates a block diagram of a system 600 including a device 605 that supports securing cloud applications in accordance with aspects of the present disclosure. The device 605 may be an example of or include components of device 305, 405, or a device as described herein, for example, such as a server (e.g., a cloud application isolation portal). The device 605 may include components for bi-directional data communications including components for transmitting and receiving data communications, including an application isolation manager 610, an I/O controller 615, a transceiver 620, an antenna 625, a memory 630, and a processor 640. These components may be in electronic communication via one or more buses (e.g., bus 645).

The application isolation manager 610 may establish a connection between the device 605 (e.g., a cloud application isolation portal), a cloud access security broker, and a cloud application based at least in part on an indication of the cloud application and a set of credentials associated with an end user of the cloud application, and manage, via the device 605 (e.g., a cloud application isolation portal) and the cloud access security broker, a session between the cloud application and a computing device associated with the end user based at least in part on the connection between the cloud application isolation portal with the cloud access security broker and the cloud application.

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS, ANDROID, MS-DOS, MS-WINDOWS, OS/2, UNIX, LINUX, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate packets (e.g., associated with cloud application traffic) and provide the modulated packets (e.g., associated with cloud application traffic) to the antennas for transmission, and to demodulate packets (e.g., associated with cloud application traffic) received from the antennas. In some examples, the device 605 may include a single antenna 625. However, in some examples the device 605 may have more than one antenna 625, which may be capable of concurrently transmitting or receiving multiple wireless transmissions.

The memory 630 may include a read-only memory (ROM), flash memory, a random-access memory (RAM), a flash RAM, or the like. The memory 630 may store computer-readable, computer-executable code including instructions that, when executed, cause the processor to perform various functions described herein. In some cases, the memory 620 may contain, among other things, a BIOS which may control basic hardware or software operation such as the interaction with peripheral components or devices.

The code 635 may include instructions to implement aspects of the present disclosure, including instructions to support securing cloud applications. The code 635 may be stored in a non-transitory computer-readable medium such as system memory or other type of memory. In some cases, the code 635 may not be directly executable by the processor 640 but may cause a computer (e.g., when compiled and executed) to perform functions described herein.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting securing cloud applications).

Figure 7:
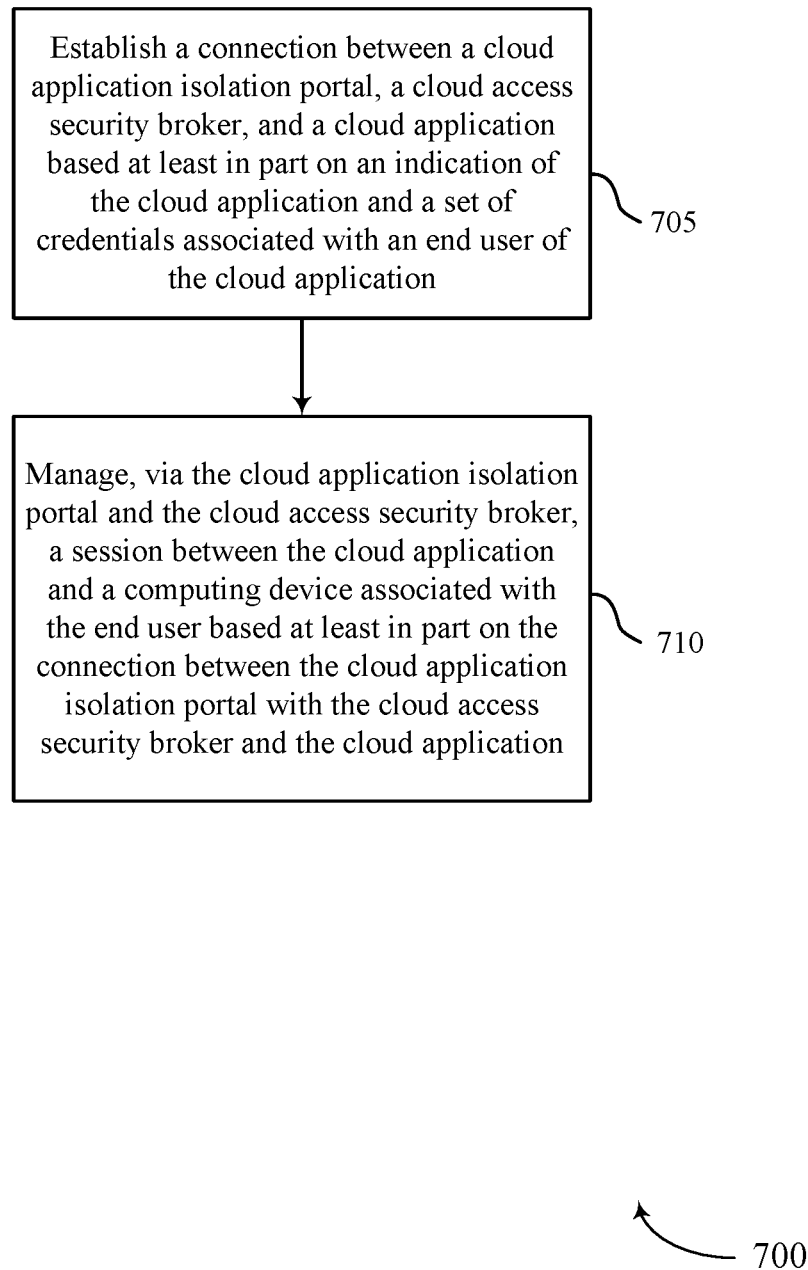
FIGS. 7 through 9 show flowcharts illustrating methods that support securing cloud applications in accordance with aspects of the present disclosure.

FIG. 7 shows a flowchart illustrating a method 700 that supports securing cloud applications in accordance with aspects of the present disclosure. The operations of method 700 may be implemented by a device or its components described herein. For example, the operations of method 700 may be performed by an application isolation manager (e.g., a cloud application isolation portal) as described with reference to FIGS. 3 through 6. In some examples, a device may execute a set of instructions to control the functional elements of the device to perform the functions described below. Additionally, or alternatively, a device may perform aspects of the functions described below using special-purpose hardware. In the following description of the method 700, the operations may be performed in a different order than the exemplary order shown, or the operations may be performed in different orders or at different times. Certain operations may also be omitted from the method 700, and/or other operations may be added to the method 700.

At 705, the device (e.g., a cloud application isolation portal) may establish a connection between a cloud application isolation portal, a cloud access security broker, and a cloud application based at least in part on an indication of the cloud application and a set of credentials associated with an end user of the cloud application. The operations of 705 may be performed according to the methods described herein. In some examples, aspects of the operations of 705 may be performed by a connection component as described with reference to FIGS. 4 and 5.

At 710, the device (e.g., a cloud application isolation portal) may manage, via the cloud application isolation portal and the cloud access security broker, a session between the cloud application and a computing device associated with the end user based at least in part on the connection between the cloud application isolation portal with the cloud access security broker and the cloud application. The operations of 710 may be performed according to the methods described herein. In some examples, aspects of the operations of 710 may be performed by a management component as described with reference to FIGS. 4 and 5.

Benefits of the method 700 may include enabling a device (e.g., an end user terminal, a server, a network entity, and the like) to secure data sessions associated with a cloud application from an unmanaged device by isolating the data session associated with the cloud application to a cloud application isolation portal. Other benefits of the method 700 may further include preventing client-side processing of any data associated with the data session.

Figure 8:
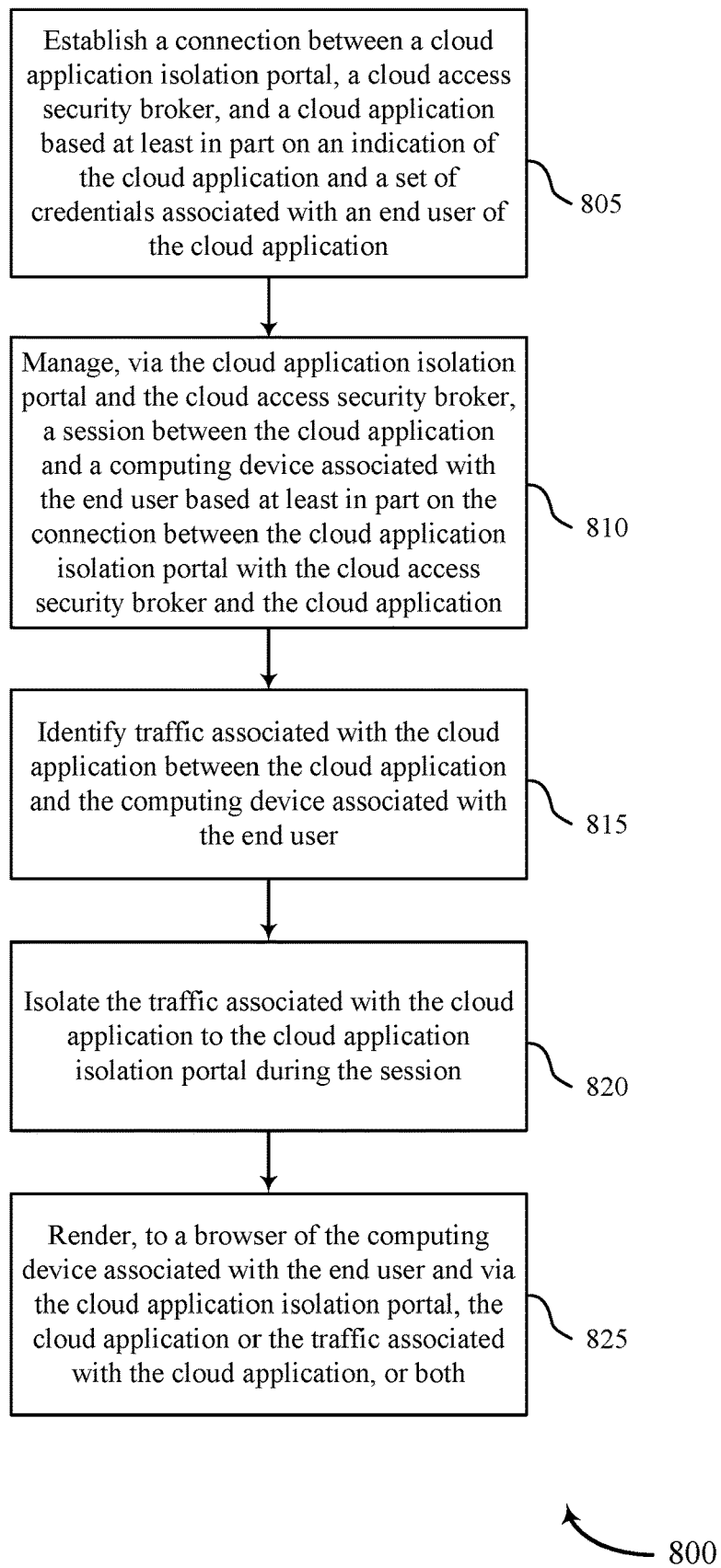

FIG. 8 shows a flowchart illustrating a method 800 that supports securing cloud applications in accordance with aspects of the present disclosure. The operations of method 800 may be implemented by a device or its components described herein. For example, the operations of method 800 may be performed by an application isolation manager (e.g., a cloud application isolation portal) as described with reference to FIGS. 3 through 6. In some examples, a device may execute a set of instructions to control the functional elements of the device to perform the functions described below. Additionally, or alternatively, a device may perform aspects of the functions described below using special-purpose hardware. In the following description of the method 800, the operations may be performed in a different order than the exemplary order shown, or the operations may be performed in different orders or at different times. Certain operations may also be omitted from the method 800, and/or other operations may be added to the method 800.

At 805, the device (e.g., a cloud application isolation portal) may establish a connection between a cloud application isolation portal, a cloud access security broker, and a cloud application based at least in part on an indication of the cloud application and a set of credentials associated with an end user of the cloud application. The operations of 805 may be performed according to the methods described herein. In some examples, aspects of the operations of 805 may be performed by a connection component as described with reference to FIGS. 4 and 5.

At 810, the device (e.g., a cloud application isolation portal) may manage, via the cloud application isolation portal and the cloud access security broker, a session between the cloud application and a computing device associated with the end user based at least in part on the connection between the cloud application isolation portal with the cloud access security broker and the cloud application The operations of 810 may be performed according to the methods described herein. In some examples, aspects of the operations of 810 may be performed by a management component as described with reference to FIGS. 4 and 5.

At 815, the device (e.g., a cloud application isolation portal) may identify traffic associated with the cloud application between the cloud application and the computing device associated with the end user. The operations of 815 may be performed according to the methods described herein. In some examples, aspects of the operations of 815 may be performed by a traffic component as described with reference to FIG. 5.

At 820, the device (e.g., a cloud application isolation portal) may isolate the traffic associated with the cloud application to the cloud application isolate portal during the session. The operations of 820 may be performed according to the methods described herein. In some examples, aspects of the operations of 820 may be performed by a management component as described with reference to FIGS. 4 and 5.

At 825, the device (e.g., a cloud application isolation portal) may render, to a browser of the computing device associated with the end user and via the cloud application isolation portal, the cloud application or the traffic associated with the cloud application, or both. The operations of 825 may be performed according to the methods described herein. In some examples, aspects of the operations of 825 may be performed by a rendering component as described with reference to FIG. 5.

Benefits of the method 800 may include enabling a device (e.g., an end user terminal, a server, a network entity, and the like) to secure data sessions associated with a cloud application from an unmanaged device by isolating the data session associated with the cloud application to a cloud application isolation portal residing remotely from the unmanaged device. Further benefits of the method 800 may include providing an interface to a browser of the unmanaged device that emulates an interface of the cloud application. Other benefits of the method 800 may further include rendering of the cloud application and cloud application traffic within the cloud application isolation portal, as well as additionally controlling the cloud application traffic within the cloud application isolation portal, thereby preventing client-side processing of any data associated with the data session.

Figure 9:
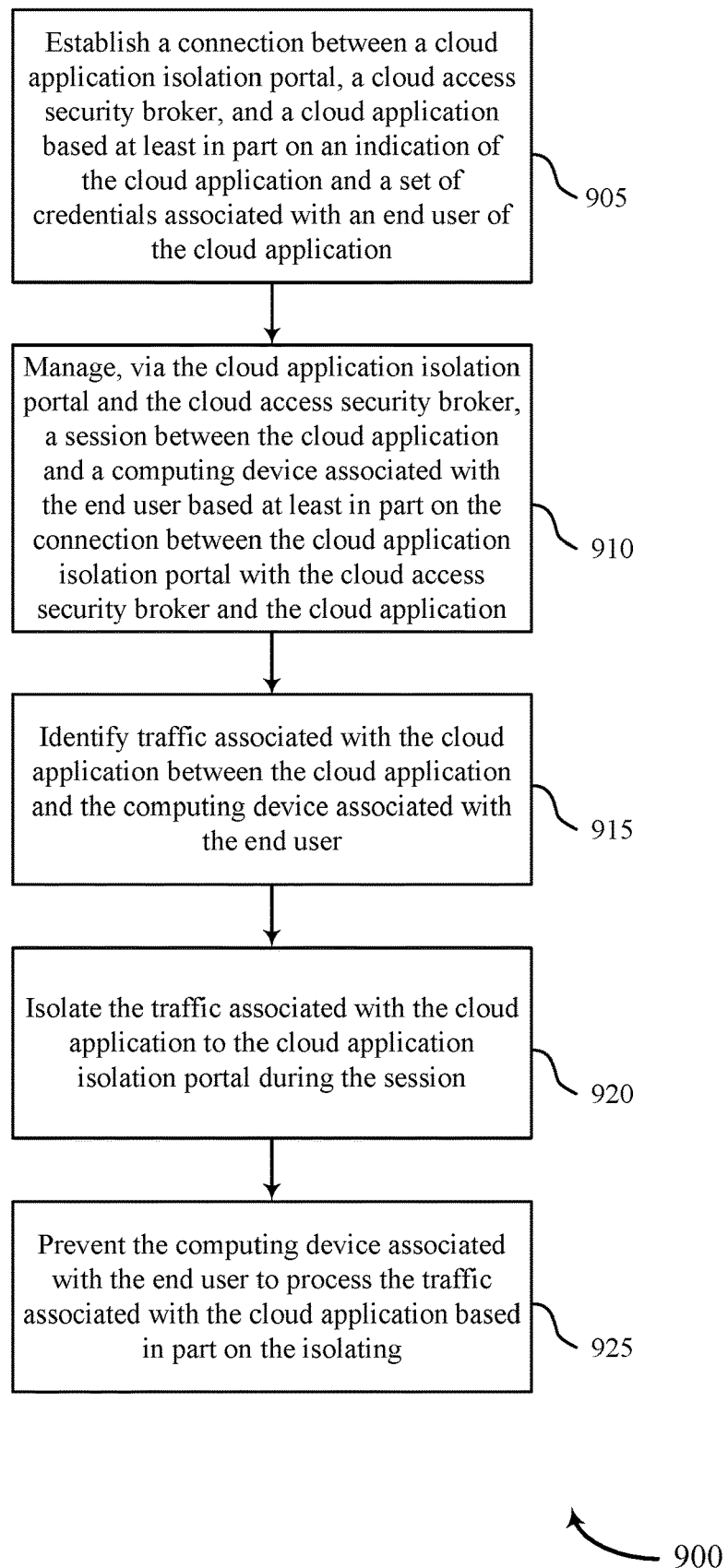

FIG. 9 shows a flowchart illustrating a method 900 that supports securing cloud applications in accordance with aspects of the present disclosure. The operations of method 900 may be implemented by a device or its components described herein. For example, the operations of method 900 may be performed by an application isolation manager (e.g., a cloud application isolation portal) as described with reference to FIGS. 3 through 6. In some examples, a device may execute a set of instructions to control the functional elements of the device to perform the functions described below. Additionally, or alternatively, a device may perform aspects of the functions described below using special-purpose hardware. In the following description of the method 900, the operations may be performed in a different order than the exemplary order shown, or the operations may be performed in different orders or at different times. Certain operations may also be omitted from the method 900, and/or other operations may be added to the method 900.

At 905, the device (e.g., a cloud application isolation portal) may establish a connection between a cloud application isolation portal, a cloud access security broker, and a cloud application based at least in part on an indication of the cloud application and a set of credentials associated with an end user of the cloud application. The operations of 905 may be performed according to the methods described herein. In some examples, aspects of the operations of 905 may be performed by a connection component as described with reference to FIGS. 4 and 5.

At 910, the device (e.g., a cloud application isolation portal) may manage, via the cloud application isolation portal and the cloud access security broker, a session between the cloud application and a computing device associated with the end user based at least in part on the connection between the cloud application isolation portal with the cloud access security broker and the cloud application. The operations of 910 may be performed according to the methods described herein. In some examples, aspects of the operations of 910 may be performed by a management component as described with reference to FIGS. 4 and 5.

At 915, the device (e.g., a cloud application isolation portal) may identify traffic associated with the cloud application between the cloud application and the computing device associated with the end user. The operations of 915 may be performed according to the methods described herein. In some examples, aspects of the operations of 915 may be performed by a traffic component as described with reference to FIG. 5.

At 920, the device (e.g., a cloud application isolation portal) may isolate the traffic associated with the cloud application to the cloud application isolate portal during the session. The operations of 920 may be performed according to the methods described herein. In some examples, aspects of the operations of 920 may be performed by a management component as described with reference to FIGS. 4 and 5.

At 925, the device (e.g., a cloud application isolation portal) may prevent the computing device associated with the end user to process the traffic associated with the cloud application based at least in part on the isolating. The operations of 925 may be performed according to the methods described herein. In some examples, aspects of the operations of 925 may be performed by a management component as described with reference to FIGS. 4 and 5.

Benefits of the method 900 may include enabling a device (e.g., an end user terminal, a server, a network entity, and the like) to secure data sessions associated with cloud application from an unmanaged device by isolating the data session associated with the cloud application to a cloud application isolation portal residing remotely from the unmanaged device. Further benefits of the method 900 may include preventing the unmanaged device from performing client-side processing of any data associated with the data session.

It should be noted that the methods described above describe possible implementations, and that the operations and the steps may be rearranged or otherwise modified and that other implementations are possible. Further, aspects from two or more of the methods may be combined.

Figure 10:
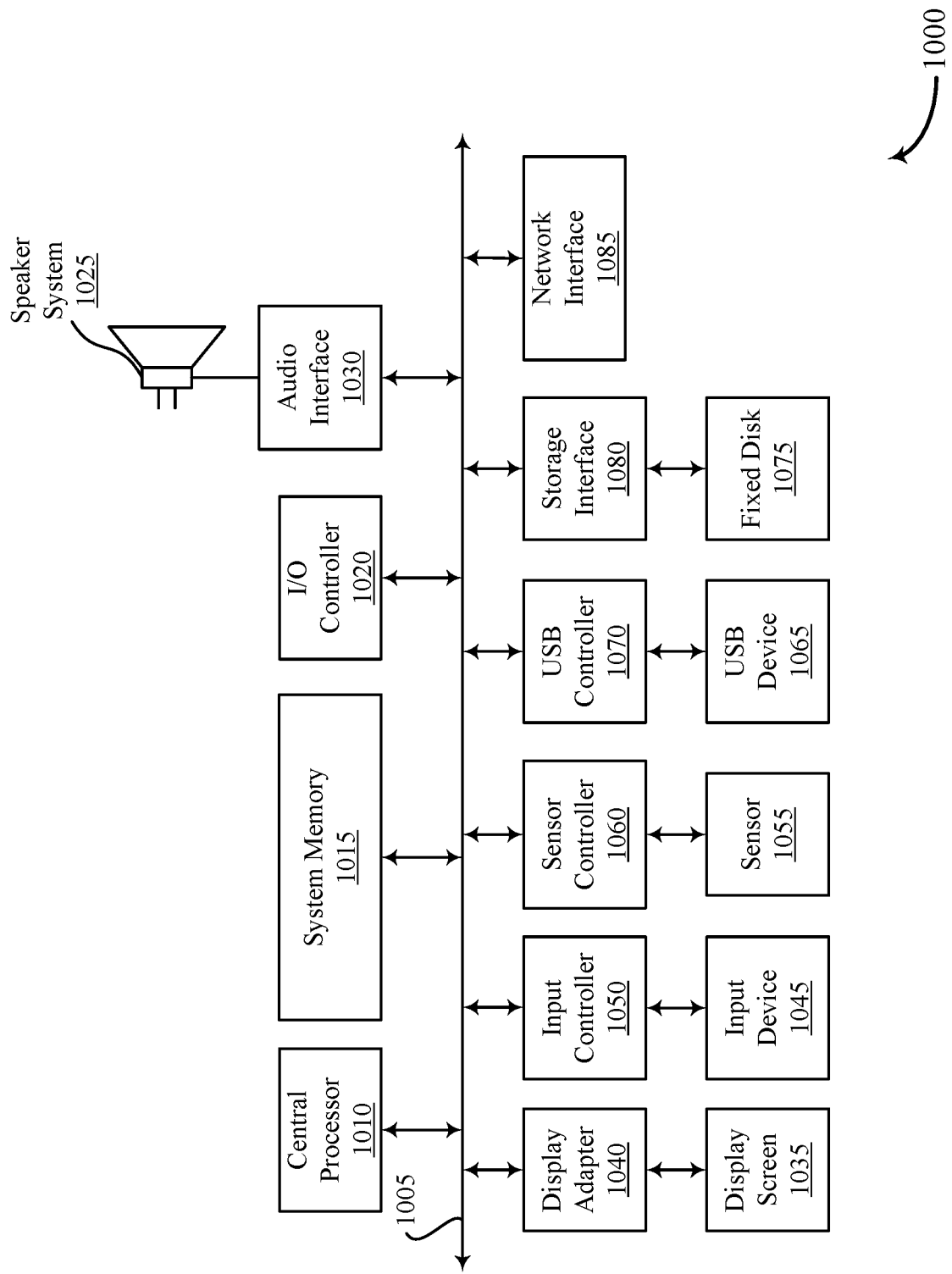
FIG. 10 illustrates a block diagram of a computing system that supports securing cloud applications in accordance with aspects of the present disclosure.

FIG. 10 illustrates a block diagram of a computing system 1000 that supports securing cloud applications in accordance with aspects of the present disclosure. For example, all or a portion of the computing system 1000 may perform and be a means for performing, either alone or in combination with other elements, one or more of the operations described herein (such as one or more of the operations as described in FIGS. 1 through 9). All or a portion of the computing system 1000 may also perform or be a means for performing any other operations, methods, or processes described and illustrated herein.

The computing system 1000 may be any single or multi-processor computing device or system capable of executing computer-readable instructions. The computing system 1000 may be an example of the computing device 105 or the server 120 as described with reference to FIG. 1. For example, the computing system 1000 may include, but is not limited to, workstations, laptops, client-side terminals, servers, distributed computing systems, handheld devices, or any other computing system or device.

In some cases, the computing system 1000 may include at least one central processor 1010 and a system memory 1015. The central processor 1010 may include any type or form of physical processing unit (e.g., a hardware-implemented central processing unit) capable of processing data or interpreting and executing instructions. In some cases, the central processor 1010 may receive instructions from a computer software application. These instructions may cause the central processor 1010 to perform the functions of one or more of the exemplary cases described and illustrated herein. The system memory 1015 may include any type or form of volatile or non-volatile storage device or medium capable of storing data and other computer-readable instructions. Examples of the system memory 1015 include Random Access Memory (RAM), Read Only Memory (ROM), flash memory, or any other suitable memory device. In one example, an application isolation manager, as described with reference to FIGS. 1 through 9, may be loaded into the system memory 1015.

In some cases, the computing system 1000 may include a bus 1005 which interconnects major subsystems of the computing system 1000, such as the central processor 1010, the system memory 1015, an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a universal serial bus (USB) controller 1070), and a storage interface 1080. Also included are at least one sensor 1055 connected to the bus 1005 through a sensor controller 1060 and a network interface 1085 (coupled directly to bus 1005).

The bus 1005 allows data communication between the central processor 1010 and the system memory 1015, which may include ROM or flash memory, and RAM, as previously noted. The RAM is generally the main memory into which the operating system and application programs are loaded. The ROM or flash memory may contain, among other code, BIOS or UEFI, which controls basic hardware operation such as the interaction with peripheral components or devices. Applications (e.g., the applications 110) resident with the computing system 1000 are generally stored on and accessed via a non-transitory computer readable medium, such as a hard disk drive (e.g., a fixed disk 1075) or other storage medium. Additionally, applications may be in the form of electronic signals modulated in accordance with the application and data communication technology when accessed via the interface 1085.

The storage interface 1080, as with the other storage interfaces of the computing system 1000, may connect to a standard computer readable medium for storage and/or retrieval of information, such as the fixed disk drive 1075. The fixed disk drive 1075 may be a part of the computing system 1000 or may be separate and accessed through other interface systems. The network interface 1085 may provide a direct connection to a remote server via a direct network link to the Internet via a POP (point of presence). The network interface 1085 may provide such connection using wireless techniques, including digital cellular telephone connection, Cellular Digital Packet Data (CDPD) connection, digital satellite data connection, or the like.

Conversely, all of the devices shown in FIG. 10 need not be present to practice the present techniques. The devices and subsystems may be interconnected in different ways from that shown in FIG. 10. The aspect of some operations of a system such as that shown in FIG. 10 are readily known in the art and are not discussed in detail in this application. Code to implement the present disclosure may be stored in a non-transitory computer-readable medium such as one or more of the system memory 1015 or the fixed disk 1075. The operating system provided on the computing system 1000 may be iOS, ANDROID, MS-DOS, MS-WINDOWS, OS/2, UNIX, LINUX, or another known operating system.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other cases of the present techniques may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there may inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with the computing system 1000 may include wireless communication signals such as radio frequency, electromagnetics, local area network (LAN), wide area network (WAN), metropolitan area network (MAN), virtual private network (VPN), wireless network (using 802.11, for example), cellular network (using 3G, Long Term Evolution (LTE), Next Generation 5G new radio (NR) for example), and/or other signals. The network interface 1085 may enable one or more of WWAN (GSM, CDMA, and WCDMA), WLAN (including BLUETOOTH and Wi-Fi), WMAN (WiMAX) for mobile communications, antennas for Wireless Personal Area Network (WPAN) applications (including RFID and UWB), etc.

The I/O controller 1020 may operate in conjunction with the network interface 1085 or the storage interface 1080, or both. The network interface 1085 may enable the computing system 900 with the ability to communicate with client devices (e.g., device 105 of FIG. 1), or other devices over the network 110 of FIG. 1, or both. The network interface 1085 may provide wired or wireless network connections, or both. In some cases, the network interface 1085 may include an Ethernet adapter or Fiber Channel adapter. The storage interface 1080 may enable the computing system 1000 to access one or more data storage devices. The one or more data storage devices may include two or more data tiers each. The storage interface 1080 may include one or more of an Ethernet adapter, a Fiber Channel adapter, Fiber Channel Protocol (FCP) adapter, a SCSI adapter, and iSCSI protocol adapter.

Figure 11:
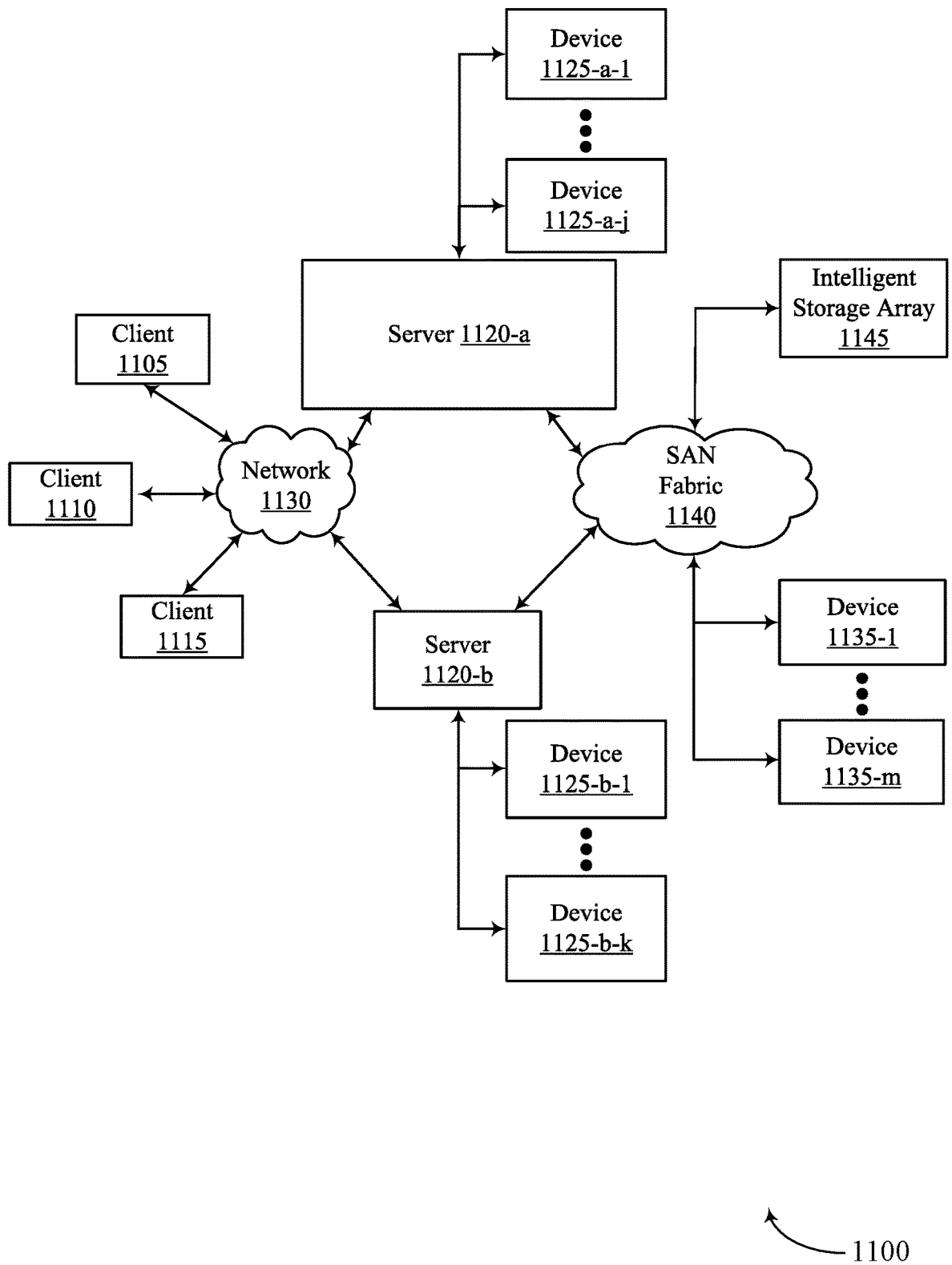
FIG. 11 illustrates a block diagram of an exemplary network architecture in which client systems and servers may be coupled to a network to support securing cloud applications in accordance with aspects of the present disclosure.

FIG. 11 illustrates a block diagram of an exemplary network architecture 1100 in which client systems 1105, 1110, and 1115 and servers 1120-*a* and 1120-*b* may be coupled to a network 1130 to support securing cloud applications, in accordance with aspects of the present disclosure. As provided above, all or a portion of the network architecture 1100 may perform or be a means for performing, either alone or in combination with other elements, one or more of the operations disclosed herein (such as one or more of the operations illustrated in FIGS. 1 through 10). All or a portion of network architecture 1100 may also be used to perform or be a means for performing other operations and features set forth in the present disclosure.

The client systems 1105, 1110, and 1115 may represent any type or form of computing device or system, such as exemplary in the computing system 1000 in FIG. 10. Similarly, the servers 1120-*a* and 1120-*b* may represent computing devices or systems, such as application servers or database servers, configured to provide various database services and run software applications. The network 1130 may represent any telecommunication or computer network including, for example, an intranet, a WAN, a LAN, a Personal Area Network (PAN), a cellular network (e.g., LTE, LTE-Advanced (LTE-A), Next Generation 5G NR network, or the Internet. In some cases, the client systems 1105, 1110, and 1115 and the server 1120-*a* or 1120-*b* may include all or a portion of the environment 100 from FIG. 1.

The application isolation manager, as described with reference to FIGS. 1 through 10, may be located within one of the client systems 1105, 1110, or 1115, or any combination thereof to implement the present techniques. For example, the application isolation manager may establish a connection between a cloud application isolation portal, a cloud access security broker, and a cloud application based at least in part on an indication of the cloud application and a set of credentials associated with an end user of the cloud application and manage, via the cloud application isolation portal and the cloud access security broker, a session between the cloud application and a computing device associated with the end user based at least in part on the connection between the cloud application isolation portal with the cloud access security broker and the cloud application. In some cases, the application isolation manager may isolate traffic associated with the cloud application to the cloud application isolation portal during the session. Alternatively, the application isolation manager, as described with reference to FIGS. 1 through 10, may optionally be located within one of the server 1120-*a* or the server 1120-*b* to implement the present techniques.

The server 1120-*a* is further depicted as having storage devices 1125-*a*-1 through 1125-*a*-*j* directly attached, and server 1120-*b* is depicted with storage devices 1125-*b*-1 through 1125-*b*-*k* directly attached. SAN fabric 1140 supports access to storage devices 1135-1 through 1135-*m* by servers 1120-*a* and 1120-*b*, and so by the client systems 1105, 1110, and 1115 via the network 1130. Intelligent storage array 1145 is also shown as an example of a specific storage device accessible via SAN fabric 1140. With reference to the computing system 1000, the network interface 1085 or some other means or method may be used to provide connectivity from each of the client systems 1105, 1110, and 1115 to the network 1130.

With reference to the computing system 600, the transceiver 625 or some other means or method may be used to provide connectivity from each of the client systems 1105, 1110, and 1115 to the network 1130. The client systems 1105, 1110, and 1115 are able to access information on the server 1120-*a* or the server 1120-*b* using, for example, a web browser or other client software. Such a client allows the client systems 1105, 1110, and 1115 to access data hosted by the server 1120-*a* or 1120-*b* or one of the storage devices 1125-*a*-1 through 1125-*a*-*j*, 1125-*b*-1 through 1125-*b*-*k*, 1135-1 through 1135-*m*, or the intelligent storage array 1145. FIG. 11 depicts the use of a network such as the Internet for exchanging data, but the present techniques are not limited to the Internet or any particular network-based environment.

In some cases, all or a portion of one or more of the exemplary cases disclosed herein may be encoded as a computer program and loaded onto and executed by the server 1120-*a* or server 1120-*b*, or the storage devices 1125-*a*-1 through 1125-*a*-*j*, the storage devices 1135-1 through 1135-*m*, the intelligent storage array 1145, or any combination thereof. All or a portion of one or more of the exemplary cases disclosed herein may also be encoded as a computer program, run by the server 1120-*a* or the stored in server 1120-*b*, and distributed to the client systems 1105, 1110, and 1115 over the network 1130. As detailed above, the computing system 1000 and/or one or more components of the network architecture 1100 may perform and/or be a means for performing, either alone or in combination with other elements, one or more operations of an exemplary method for securing cloud applications from computing devices.

While the foregoing disclosure sets forth various cases using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various cases have been described and/or illustrated herein in the context of fully functional computing systems, one or more of these exemplary cases may be distributed as a program product in a variety of forms, regardless of the particular type of computer-readable media used to actually carry out the distribution. The cases disclosed herein may also be implemented using software components that perform certain tasks. These software components may include script, batch, or other executable files that may be stored on a computer-readable storage medium or in a computing system. In some cases, these software components may configure a computing system to perform one or more of the exemplary cases disclosed herein.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The foregoing description, for purpose of explanation, has been described with reference to specific cases. However, the illustrative discussions above are not intended to be exhaustive or to limit the invention to the precise forms disclosed. Many modifications and variations are possible in view of the above teachings. The cases were chosen and described in order to best explain the principles of the present techniques and their practical applications, to thereby enable others skilled in the art to best utilize the present techniques and various cases with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining a packet injection. For example, types of security actions may include preventing the packet from performing any actions on the computing device, alerting an administrator to the potential maliciousness of the connection, quarantine a file related to the connection, delete the file, block a download of the file, and/or warn a user about the connection. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for securing cloud applications, the method being performed by one or more computing devices comprising at least one processor, the method comprising:
    establishing a connection between a cloud application isolation portal, a cloud access security broker, and a cloud application based at least in part on an indication of the cloud application and a set of credentials associated with an end user of the cloud application;

managing, via the cloud application isolation portal and the cloud access security broker, a session between the cloud application and a computing device associated with the end user via the connection between the cloud application isolation portal with the cloud access security broker and the cloud application, wherein data communicated with the cloud application is isolated to the cloud application isolation portal, wherein the cloud application isolation portal resides remotely from the computing device associated with the end user and prevents storing of the data communicated to the cloud application on the computing device associated with the end user; and providing an interface to a browser of the computing device associated with the end user, wherein the interface emulates an interface of the cloud application.

2. The method of claim 1, wherein the cloud access security broker in communication with the cloud application isolation portal and the cloud application monitors and controls traffic associated with the cloud application, and wherein managing, via the cloud application isolation portal and the cloud access security broker, the session between the cloud application and the computing device associated with the end user is further based at least in part on monitoring and controlling of the traffic associated with the cloud application.

3. The method of claim 1, further comprising:

identifying traffic associated with the cloud application between the cloud application and the computing device associated with the end user; and isolating the traffic associated with the cloud application to the cloud application isolation portal during the session, wherein managing, via the cloud application isolation portal and the cloud access security broker, the session between the cloud application and the computing device associated with the end user is further based at least in part on the isolating.

4. The method of claim 3, further comprising:

rendering, to a browser of the computing device associated with the end user and via the cloud application isolation portal, the cloud application or the traffic associated with the cloud application, or both, wherein managing, via the cloud application isolation portal and the cloud access security broker, the session between the cloud application and the computing device associated with the end user is further based at least in part on the rendering.

5. The method of claim 4, wherein rendering, via the cloud application isolation portal, the cloud application or the traffic associated with the cloud application, or both, to the browser of the computing device associated with the end user is based at least in part on a forward proxy mode.

6. The method of claim 3, further comprising:

preventing the computing device associated with the end user to process the traffic associated with the cloud application based at least in part on the isolating, wherein managing, via the cloud application isolation portal and the cloud access security broker, the session between the cloud application and the computing device associated with the end user is further based at least in part on the preventing.

7. The method of claim 1, further comprising:

receiving the set of credentials associated with the end user of the cloud application based at least in part on the cloud application receiving a request via a browser of the computing device associated with the end user to access the cloud application.

8. The method of claim 7, wherein the cloud application forwards the browser of the computing device associated with the end user to a single sign-on resource based at least in part on an identifier of the computing device or an identifier of the end user, or both.

9. The method of claim 8, wherein the single sign-on resource comprises a proxy.

10. The method of claim 8, wherein the single sign-on resource forwards the identifier of the computing device, the identifier of the end user, metadata, or a combination thereof, to an identity provider network entity to authenticate the set of credentials.

11. A computing device configured for securing cloud applications, further comprising:

one or more processors;

memory in electronic communication with the one or more processors, wherein the memory stores computer executable instructions that when executed by the one or more processors cause the one or more processors to:

establish a connection between the computing device, a cloud access security broker, and a cloud application based at least in part on an indication of the cloud application and a set of credentials associated with an end user of the cloud application;

manage, via the computing device and the cloud access security broker, a session between the cloud application and a second computing device associated with the end user via the connection between the cloud application isolation portal with the cloud access security broker and the cloud application, wherein data communicated with the cloud application is isolated to the application isolation portal, wherein the cloud application isolation portal resides remotely from the second computing device associated with the end user and prevents storing of the data communicated with the cloud application on the second computing device associated with the end user; and provide an interface to a browser of the second computing device associated with the end user, wherein the interface emulates an interface of the cloud application.

12. The computing device of claim 11, wherein the cloud access security broker in communication with the cloud application isolation portal and the cloud application monitors and controls traffic associated with the cloud application, and wherein managing, via the cloud application isolation portal and the cloud access security broker, the session between the cloud application and the second computing device associated with the end user is further based at least in part on monitoring and controlling of the traffic associated with the cloud application.

13. The computing device of claim 11, wherein the instructions are further executable by the one or more processors to:

identify traffic associated with the cloud application between the cloud application and the second computing device associated with the end user; and isolate the traffic associated with the cloud application to the cloud application isolation portal during the session, wherein the instructions to manage, via the cloud application isolation portal and the cloud access security broker, the session between the cloud application and the second computing device associated with the end user are further executable by the one or more processors based at least in part on the isolating.

14. The computing device of claim 13, wherein the instructions are further executable by the one or more processors to:
   render, to a browser of the second computing device associated with the end user and via the cloud application isolation portal, the cloud application or the traffic associated with the cloud application, or both,
   wherein the instructions to manage, via the cloud application isolation portal and the cloud access security broker, the session between the cloud application and the second associated with the end user are further executable by the one or more processors based at least in part on the rendering.

15. The computing device of claim 14, wherein the instructions to render, via the cloud application isolation portal, the cloud application or the traffic associated with the cloud application, or both, to the browser of the computing device associated with the end user are further executable by the one or more processors based at least in part on a forward proxy mode.

16. The computing device of claim 13, wherein the instructions are further executable by the one or more processors to:
   prevent the second computing device associated with the end user to process the traffic associated with the cloud application based at least in part on the isolating,
   wherein the instructions to manage, via the cloud application isolation portal and the cloud access security broker, the session between the cloud application and the second computing device associated with the end user are further executable by the one or more processors based at least in part on the preventing.

17. A non-transitory computer-readable medium storing computer executable instructions for securing cloud applications at a computing device comprising one or more processors, that when executed by the one or more processors cause the one or more processors to:
   establish a connection between a cloud application isolation portal, a cloud access security broker, and a cloud application based at least in part on an indication of the cloud application and a set of credentials associated with an end user of the cloud application;
   manage, via the cloud application isolation portal and the cloud access security broker, a session between the cloud application and a computing device associated with the end user via the connection between the cloud application isolation portal with the cloud access security broker and the cloud application, wherein data communicated with the cloud application is isolated to the cloud application isolation portal, wherein the cloud application isolation portal resides remotely from the computing device associated with the end user and prevents storing of the data communicated with the cloud application on the computing device associated with the end user; and
   provide an interface to a browser of the computing device associated with the end user, wherein the interface emulates an interface of the cloud application.

* * * * *